United States Patent

Sexton et al.

[11] Patent Number: 6,036,138
[45] Date of Patent: Mar. 14, 2000

[54] SPOOL FOR HOLDING WINDINGS OF OPTICAL FIBER

[75] Inventors: James William Sexton, Easley; William C. Wilson, Greenville, both of S.C.

[73] Assignee: McKechnie Plastic Components, Inc., Easley, S.C.

[21] Appl. No.: 09/073,698

[22] Filed: May 6, 1998

[51] Int. Cl.$^7$ ................................................. B65H 75/06
[52] U.S. Cl. ..................................... 242/608.8; 242/610.6
[58] Field of Search ............................. 242/608.8, 609.4, 242/610.6, 118.61, 118.7; 156/272.4

[56] References Cited

U.S. PATENT DOCUMENTS

| | | | |
|---|---|---|---|
| 2,753,622 | 7/1956 | Bieber et al. | 242/608.8 |
| 3,128,959 | 4/1964 | Pelson | 242/608.8 |
| 3,289,965 | 12/1966 | Cuva | 242/608.8 |
| 3,794,258 | 2/1974 | Posso et al. | 242/608.8 |
| 4,184,650 | 1/1980 | Nelson et al. | 242/608.8 |
| 4,184,653 | 1/1980 | Bonzo . | |
| 4,696,438 | 9/1987 | Myers . | |
| 5,074,487 | 12/1991 | Okamura et al. | 242/608.8 |
| 5,318,239 | 6/1994 | Posso | 242/608.8 |
| 5,354,393 | 10/1994 | Hirata | 156/272.4 |
| 5,400,981 | 3/1995 | Rambosek et al. | 242/608.8 |
| 5,444,220 | 8/1995 | Hansen et al. | 219/633 |
| 5,453,149 | 9/1995 | Szczesniak | 156/272.4 |
| 5,481,091 | 1/1996 | Grimm et al. | 219/633 |
| 5,481,799 | 1/1996 | McGaffigan | 156/272.4 |
| 5,534,097 | 7/1996 | Fasano et al. | 156/272.4 |
| 5,702,066 | 12/1997 | Hurst et al. . | |
| 5,710,412 | 1/1998 | Hansen | 219/633 |
| 5,833,795 | 11/1998 | Smith et al. | 156/272.4 |

FOREIGN PATENT DOCUMENTS 991827  5/1965  United Kingdom ............. 242/118.61

*Primary Examiner*—John M. Jillions
*Attorney, Agent, or Firm*—MacMillan, Sobanski & Todd, LLC

[57] ABSTRACT

A spool which is used for holding windings of optical fiber includes a first portion having a first side wall flange and defining a first locating surface and a first welding surface. The spool further includes a complimentary second portion having a second side wall flange and defining a second locating surface and a second welding surface. The first and second locating surfaces are in engagement with one another and cooperating to orient the first and second portions such that the first and second side wall flanges are in a generally parallel arrangement with each other. The spool further includes a welding material disposed between the first and second welding surfaces for securing the first and second portions together.

11 Claims, 3 Drawing Sheets

SPOOL FOR HOLDING WINDINGS OF OPTICAL FIBER

BACKGROUND OF THE INVENTION

This invention relates in general to spools and in particular to an improved spool for holding windings of optical fiber.

Optical fiber, or sometimes referred to as optical waveguide filament, is a small diameter fiber used to transmit information in the form of light pulses emitted from a laser. Optical fiber is generally made of composites of glass and plastic. The strands of optical fiber are very thin, delicate, and are relatively expensive to manufacture. Therefore, it is important to store the optical fiber so as to prevent damage thereto.

Optical fiber is typically wound onto spools for storage and for easy dispensing. The spools have a cylindrical body and a pair of annular side wall flanges extending radial outwardly from the ends of the cylindrical body. The optical fiber is wound around the cylindrical body between the pair of annular side wall flanges. The spools can also include a layer of foam material wrapped around the cylindrical body to further protect the optical fiber. Typically, the spools are made of plastic and can be formed by injection molding manufacturing processes. However, the shape of the spool makes it difficult to manufacture the spool as a single part by injection molding methods.

It is known to manufacture a spool assembly by fastening two spool halves together. Each spool half is formed by an injection molding manufacturing process. The spool halves can be identical parts such that each half includes a portion of the cylindrical body and an annular side wall flange extending radially outwardly from one of the ends of the cylindrical body. The spool halves have cooperating holes and pegs formed at the ends of the cylindrical bodies to guide the spool halves together in a co-axial orientation. The spool halves are fastened together by applying an adhesive to the open ends of the spool halves and then joining the spool halves together such that the adhesive is disposed between the spool halves. It is difficult to obtain very close tolerances since the layer of adhesive may set at a non-constant thickness between the two spool halves. An uneven thickness of the adhesive can misalign the spool halves so that the annular side wall flanges are not parallel to each other. Non-parallel annular side wall flanges can cause the optical fiber to be incorrectly wrapped around the cylindrical body. The width between the annular side wall flanges should also be accurate and constant so that different spool assemblies will have the same length of optical fiber wound around the cylindrical body.

BRIEF SUMMARY OF THE INVENTION

This invention relates in general to spools, and in particular to an improved spool for holding windings of optical fiber.

The spool includes a first portion having a radially outwardly extending first side wall flange. The first portion defines a first locating surface and a first welding surface. The spool further includes a complimentary second portion having a radially outwardly extending second side wall flange. The second portion defines a second locating surface and a second welding surface. The first and second locating surfaces are in engagement with one another and cooperate to orient the first and second portions such that the first and second side wall flanges are in a generally parallel arrangement with each other. The spool further includes a welding material disposed between the first and second welding surfaces for securing the first and second portions together.

In a preferred embodiment, the first portion includes an extension having a tubular shape which extends axially from the first portion. The extension has a notch formed therein which forms a shoulder defining the first locating surface. The second portion has an annular shaped groove for receiving the extension of the first portion. The welding material is disposed in the annular shaped groove and surrounds the end of the tubular shaped extension.

Preferably, the welding material is a thermoplastic welding material having ferromagnetic material dispersed therein. The ferromagnetic material enables the thermoplastic material to melt when the ferromagnetic material is subjected to alternating magnetic fields, such as by an induction coil.

Various objects and advantages of this invention will become apparent to those skilled in the art from the following detailed description of the preferred embodiment, when read in light of the accompanying drawings.

DETAILED DESCRIPTION OF THE INVENTION

Figure 1:
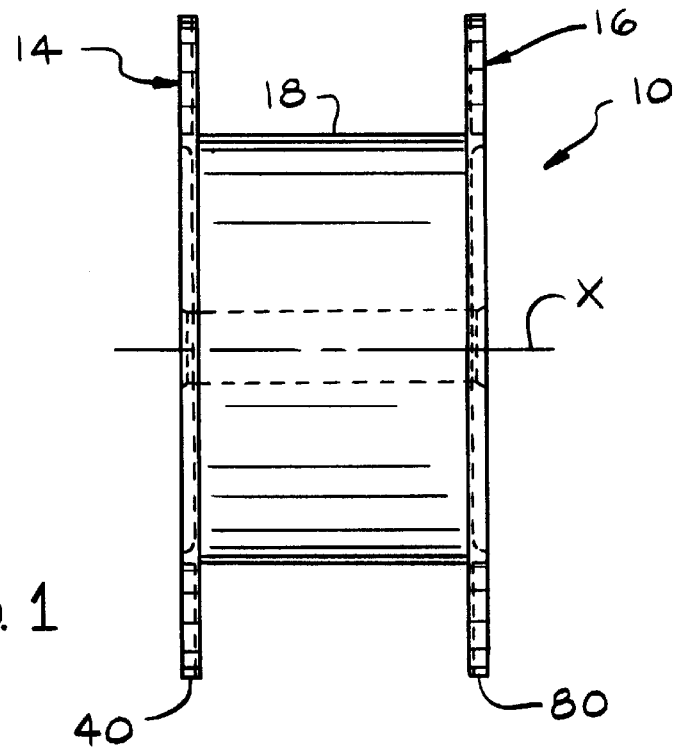
FIG. 1 is a front elevational view of a spool assembly in accordance with the present invention.
Figure 2:
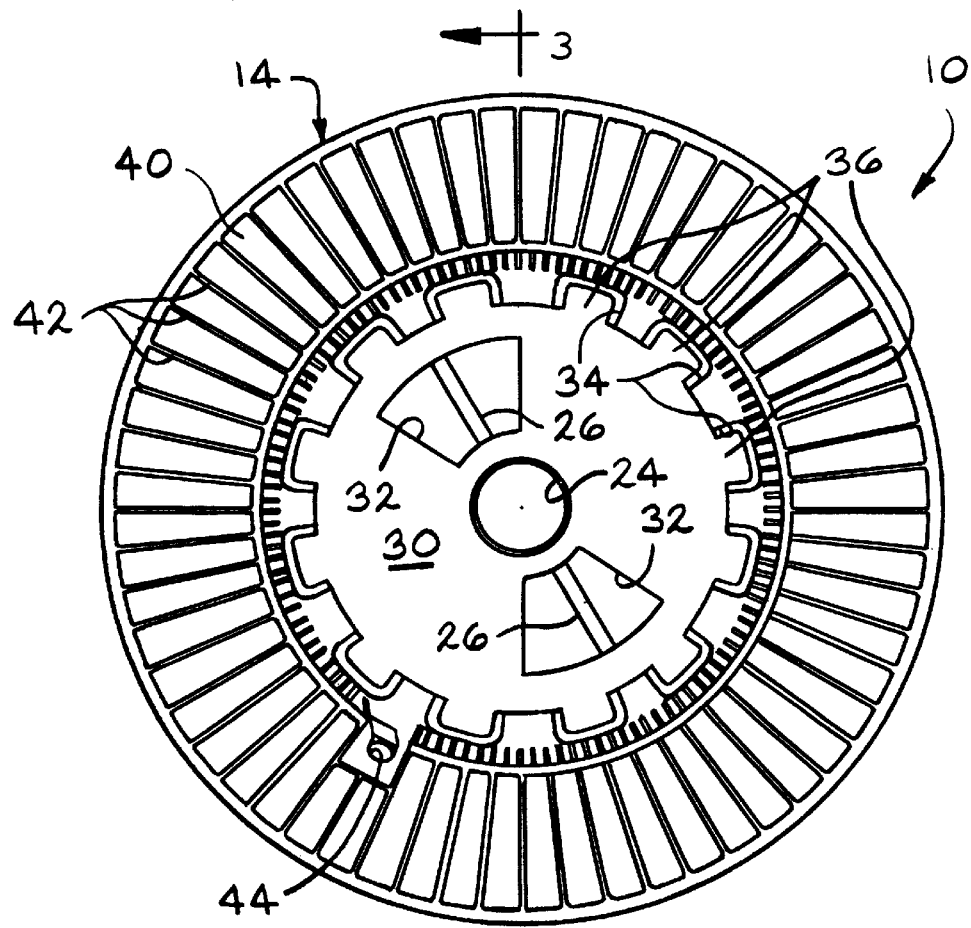
FIG. 2 is a side elevational view of the spool assembly of FIG. 1.
Figure 3:
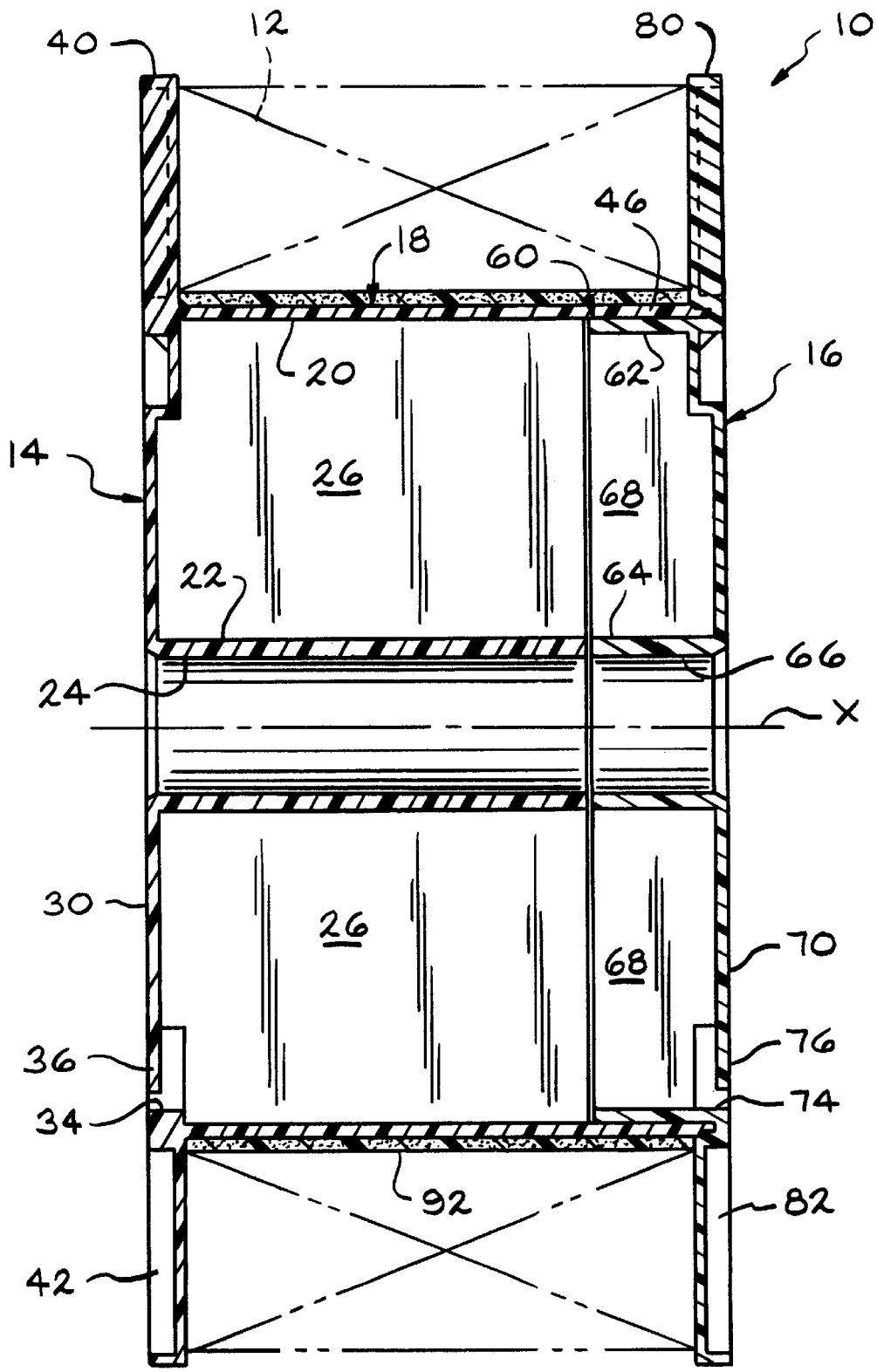
FIG. 3 is a sectional view of the spool assembly taken along Lines 3—3 of FIG. 2.

Referring now to the drawings, there is illustrated in FIGS. 1 through 3 a spool assembly, indicated generally at 10, in accordance with the present invention. The spool assembly 10 is ideally suited for holding windings of optical fiber, represented by phantom lines 12 in FIG. 3. The spool assembly 10 is formed by joining a first portion 14 to a second portion 16. The first and second portions 14 and 16 are preferably made of a plastic or polymer material, and can be formed by any suitable method, such as by an injection molding manufacturing process.

The first portion 14 includes a cylindrical body, indicated generally at 18. The cylindrical body 18 defines an axis X. As best shown in FIG. 3, the cylindrical body 18 includes an outer tube 20 and an inner tube 22 positioned co-axial to the outer tube 20. The inner tube 22 defines an axial bore 24 formed therethrough. A plurality of web members 26 extend radially between the inner tube 20 and the outer tube 22 and are arranged in a spoke-like pattern. Although the cylindrical body 18 is illustrated as having the outer tube 20, the inner tube 22, and the plurality of web members 26, the cylindrical body 18 could be formed into any suitable structural shape, such as solid or a honeycomb structure.

The cylindrical body 18 further includes an annular disk 30 extending between the left-hand ends of the outer and inner tubes 20 and 22, as shown in FIG. 3. The annular disk 30 has a pair of arcuate slots 32 formed therethrough. The axial bore 24 and the arcuate slots 32 are adapted to receive an arbor of a winding device (not shown) for rotating the spool assembly 10 for winding or paying out optical fiber from the spool assembly 10. The annular disk 30 further includes a plurality of U-shaped slots 34 which form radially extending tabs 36. The slots 34 and tabs 36 are spaced apart from one another in an arcuate arrangement about the annular disk 30. As will be described below, the slots 34 and the tabs 36 provide for frictional attachment points for an end of the optical fiber which is to be wound on the spool assembly 10.

An annular side wall flange 40 extends radially outwardly from the left-hand end of the cylindrical body 18, as shown in FIG. 3. For rigidity, the annular side wall flange 40 can include a plurality of radially extending strengthening ribs 42. Of course, the annular side wall flange 40 can have any suitable cross-sectional shape. An opening 44 is formed through the annular side wall flange 40. To attach an optical fiber (not shown) which is to be wound onto the spool assembly 10, a leading end of the optical fiber is inserted through the opening 44. The leading end of the optical fiber is then looped around a multiple number of tabs 36 until a sufficient amount of frictional force holds the optical fiber securely.

Figure 4:
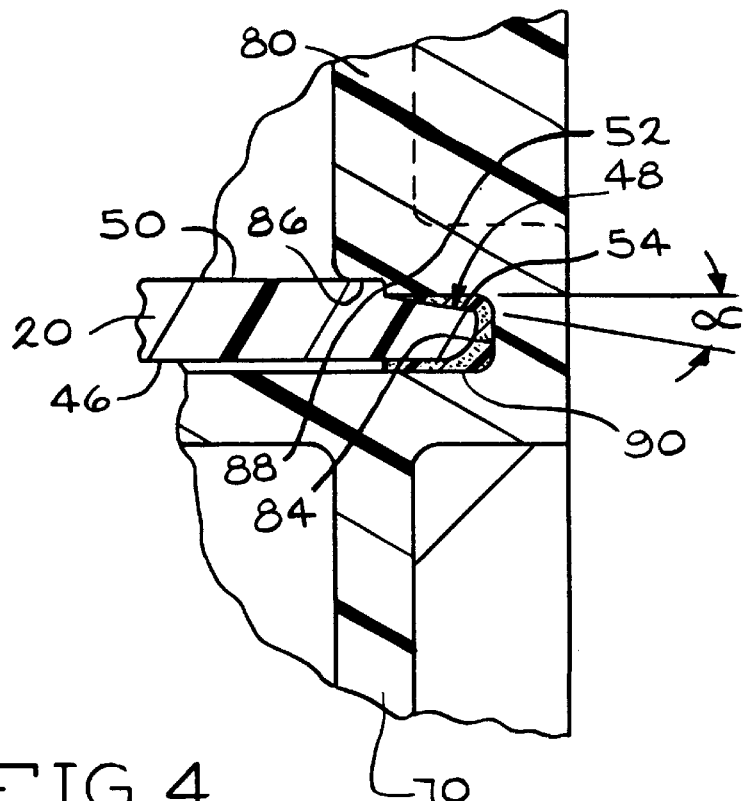
FIG. 4 is an enlarged sectional view of a portion of the spool assembly.

The outer tube 20 of the cylindrical body 18 has an axially extending tubular extension 46. As best seen in FIG. 4, which is an enlarged sectional view of an upper right-hand portion of the spool assembly 10 of FIG. 3, the tubular extension 46 has an annular notch 48 formed therein. The notch 48 extends radially inwardly from a generally cylindrical outer surface 50 of the tubular extension 46 of the outer tube 20. The notch 48 forms a radially extending shoulder 52 and an annular sloped surface 54. The sloped surface 54 is formed at an angle a with respect to the axis X, the reason for which will be explained below.

The second portion 16 includes a cylindrical plug, indicated generally at 60. The cylindrical plug 60 is co-axial with the cylindrical body 18 of the first portion 14 and is disposed within the tubular extension 46 of the outer tube 20. The cylindrical plug 60 is similar in structure to the cylindrical body 18 of the first portion 14. The cylindrical plug 60 includes an outer tube 62 and an inner tube 64. The inner tube 64 defines an axial bore 66 formed therethrough. A plurality of web members 68 extend radially between the inner tube 64 and the outer tube 62, and are arranged in a spoke-like pattern. Of course, the cylindrical plug 60 could be formed into any suitable structural shape, such as solid or honeycomb shaped.

The cylindrical plug 60 further includes an annular disk 70 extending between the right-hand ends of the outer and inner tubes 62 and 64, as shown in FIG. 3. The annular disk 70 may have a pair of arcuate slots (not shown) which function similarly to the arcuate slots 32 of the annular disk 30, as described above. The annular disk 70 further includes a plurality of U-shaped slots 74 which form radially extending tabs 76. The slots 74 and tabs 76 are spaced apart from one another in an arcuate arrangement about the annular disk 70 and function similarly to the slots 34 and tabs 36 of the annular disk 30 of the cylindrical body, as described above.

As shown in FIGS. 1 and 3, an annular side wall flange 80 extends radially outwardly from the right-hand end of the cylindrical plug 60. For rigidity, the annular side wall flange 80 can include a plurality of radially extending strengthening ribs 82 or any other suitable cross-sectional shape. The annular side wall flange 80 can also include an opening (not shown) similar to the opening 44 of the annular side wall flange 40 to provide a pathway for an end of an optical fiber.

As best shown in FIG. 4, the cylindrical plug 60 has an annular groove 84 formed therein adjacent the annular side wall flange 80. The annular groove 84 has an inwardly extending annular notch 86 formed therein which defines a radially extending shoulder 88. Note that the radially extending surface of the shoulder 52 of the tubular extension 46 is in abutting contact with the radially extending surface of the shoulder 88 formed in the cylindrical plug 70. The shoulders 52 and 88 function as locating surfaces which cooperate to orient the first and second portions 14 and 16 such that the annular side wall flanges are in a generally parallel arrangement with each other.

Figure 5:
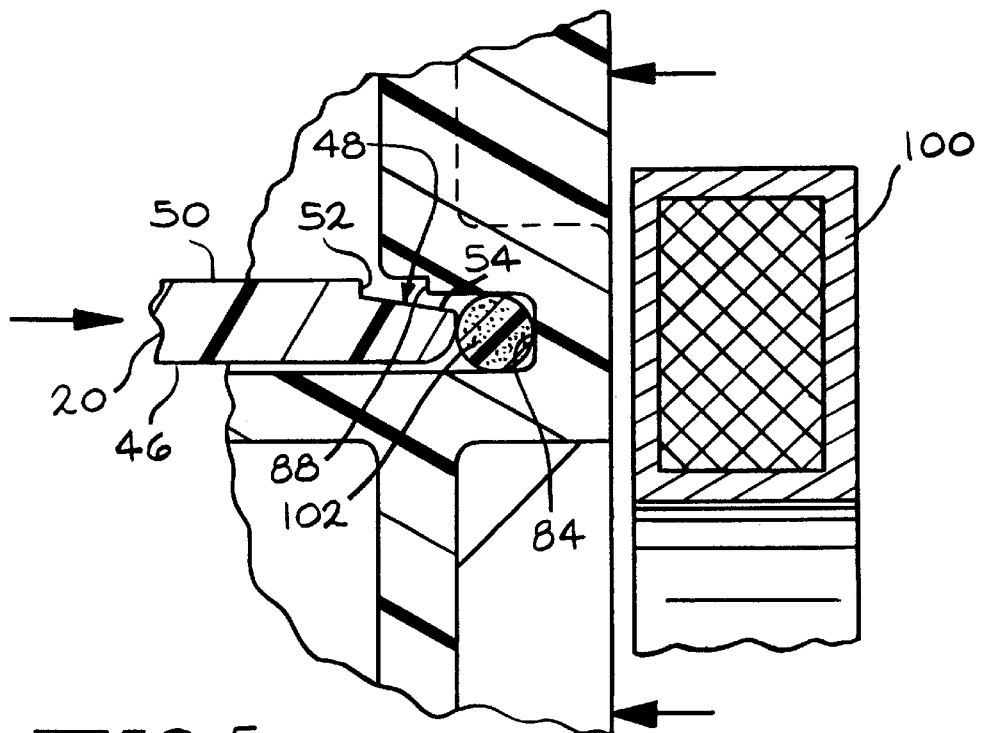
FIG. 5 is an enlarged sectional view illustrating a method of welding portions of the spool assembly together, in accordance with the present invention.

The first and second portions 14 and 16 are joined together by a circular bead of weld material 90 disposed in the annular groove 84 of the cylindrical plug 70, and in contact with the tubular extension 46 of the outer tube 20. The weld material 90 can be any suitable material, such as an adhesive or other weld material, which can secure or join the first and second portions 14 and 16 together. Preferably, the weld material 102 is a thermoplastic weld material which when heated and positioned adjacent the first and second portions 14 and 16 will secure or fuse the first and second portions 14 and 16 together. The heating of the thermoplastic weld material 102 may also melt adjacent material of the first and second portions 14 and 16 to create a sufficiently strong weld. Thus, the surfaces at the end of the tubular extension 46 and the walls of the annular groove 84 function as welding surfaces by accepting the thermoplastic welding material 102 for securing the first and second portions 14 and 16 together. Preferably, the annular groove 84 is wider than the end of the tubular extension 46 so that the weld material 90 surrounds the end of the tubular extension 46, thereby providing a relatively large welding surface area. As shown in FIG. 5, the sloped surface 54 formed in the tubular extension 46 provides for an open area in which the weld material 90 can fill, thereby increasing the welding surface area. Since the shoulder 52 of the tubular extension 46 is in abutting contact with the shoulder 88 of the cylindrical plug 70, the spool assembly 10 can be manufactured with relatively tight tolerances so that the annular side wall flanges 40 and 80 are parallel with each other within a sufficient tolerance range.

The unique configuration of the spool assembly 10 of the present invention allows the first and second portions 14 and 16 to be in abutting contact with each other so that a relatively large amount of weld material or an adhesive is not directly disposed therebetween. Prior art spool assemblies having two portions which are joined together with a layer of welding or adhesive material directly therebetween can be assembled such that the welding or adhesive material varies in thickness. This varying thickness can cause the annular side wall flanges of the prior art spool assembly to become non-parallel with each other by an undesirable amount. Preferably, the shoulder 52 of the spool assembly 10 is in direct contact and engagement with the shoulder 88. However, depending on the type of weld material used and the placement of the weld material 90, there might be a relatively small amount or film layer between the shoulders 52 and 88.

Although the shoulders 52 and 88 are described as having a continuous annular shape, the tubular extension 46 and the annular groove 84 can be formed non-continuous, such as for example, formed as a plurality of tabs which are disposed in a plurality of mating slots. Furthermore, although the shoulders 52 and 88 are described and illustrated as having radially extending surfaces which extend perpendicular to the axis X, the surfaces of the shoulders 52 and 88 can extend at any suitable angle with respect to the axis X or can be formed as any suitable mating shapes.

As shown in FIG. 3, the spool assembly 10 may also include an optional foam layer 92 wrapped around the outer surface of the outer tube 20 of the cylindrical body 18. The foam layer 92 provides cushioning protection for the optical fiber 12.

Preferably, the first and second portions 14 and 16 are welded together by an induction heating process using an induction coil 100, as shown in FIG. 5. The induction coil 100 is positioned adjacent a bead of thermoplastic welding material 102 disposed in the annular groove 84 of the cylindrical plug 70. Preferably, the bead of thermoplastic welding material 102 has ferromagnetic particles dispersed throughout. The induction coil 100 is then energized so as to subject the bead of thermoplastic welding material 102 to alternating magnetic fields. The alternating magnetic fields excite the ferromagnetic particles, thereby causing the thermoplastic welding material to heat up. The induction coil 100 is energized until the thermoplastic weld material 102 reaches its melting point and bonds with the surrounding material of the first and second portions 14 and 16, and in particular with the tubular extension 46 and the walls adjacent the annular groove 84. During the heating of the thermoplastic welding material 102, the first portion 14 and the second portion 16 are moved towards each other until the surface of the shoulder 52 of the tubular extension 46 is in abutting contact with the shoulder 88 of the cylindrical plug 60. Movement of the first and second portions 14 and 16 causes the thermoplastic welding material 102 to surround the end of the tubular extension 46, thereby forming a U-shape cross-section, as illustrated in FIG. 4. The induction coil 100 is then deenergized causing the thermoplastic welding material 102 to cool, thereby welding or joining the first and second portions 14 and 16 to form the spool assembly 10. The heating of the thermoplastic weld material 102 may also melt adjacent material of the first and second portions 14 and 16 to create a sufficiently strong weld.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A spool comprising:
    a first portion having a first side wall flange, said first portion defining a first locating surface and a first welding surface spaced apart from said first locating surface;
    a complimentary second portion having a second side wall flange, said second portion defining a second locating surface and a second welding surface spaced apart from said second locating surface, said first and second locating surfaces being in direct engagement with one another and cooperating to orient said first and second portions such that said first and second side wall flanges are in a generally parallel arrangement with each other; and
    a welding material separate from said first and second portions, said welding material disposed between said first and second welding surfaces for securing said first and second portions together, said welding material being a thermoplastic weld material having a plurality of non-continuous ferromagnetic particles disposed therein enabling said thermoplastic weld material to melt when said ferromagnetic particles are subjected to alternating magnetic fields.

2. The spool of claim 1, wherein said first portion includes a tubular extension having a notch formed therein defining said first locating surface, said second portion having a stepped annular groove formed therein defining said second locating surface, said tubular extension being disposed in said annular groove such that a gap is defined between an end of said tubular extension and an end wall of said annular groove, said end of said tubular extension defining said first welding surface, said end wall of said annular groove defining said second welding surface, and wherein said welding material is disposed in said gap.

3. A spool comprising:
    a first portion having a first side wall flange and a tubular extension defining a first surface;
    a second portion having a second side wall flange, said second portion having an annular groove formed therein defining a second surface, said tubular extension disposed in said annular groove such that a gap is defined between an end of said tubular extension and an end wall of said annular groove;
    a thermoplastic weld material disposed in said gap between said first and second surfaces for securing said first and second portions together, said thermoplastic material having ferromagnetic material dispersed therein, said ferromagnetic material enabling said thermoplastic weld material to melt when said ferromagnetic material is subjected to alternating magnetic fields.

4. The spool of claim 3, wherein said annular groove has a width which is greater than the width of said tubular extension to permit said welding material to surround said end of said tubular extension.

5. The spool of claim 4, wherein said tubular extension has an annular sloped surface formed at an angle to an axis defined by said tubular extension to permit said welding material to surround said end of said tubular extension.

6. A spool comprising:

a first portion having a first side wall flange and a tubular extension, said tubular extension having a notch formed therein defining a shoulder;

a complimentary second portion having a second side wall flange, said second portion having an annular groove formed in a first surface thereof, said tubular extension of said first portion disposed in said annular groove of said second portion such that said shoulder engages said first surface to orient said first and second portions such that said first and second side wall flanges are in a generally parallel arrangement with each other; and a welding material disposed between said first and second portions for securing said first and second portions together.

7. The spool of claim 6, wherein said first portion includes a cylindrical body disposed between said first side wall flange and said tubular extension, said cylindrical body defining an axis which is perpendicular to said first and second side wall flanges.

8. The spool of claim 6, wherein said tubular extension is disposed in said annular groove such that a gap is defined therebetween, said welding material being disposed in said gap.

9. The spool of claim 6, wherein said annular groove has a width which is greater than the width of said tubular extension to permit said welding material to surround an end of said tubular extension.

10. The spool of claim 9, wherein said tubular extension has an annular sloped surface formed at an angle to an axis defined by said tubular extension to permit said welding material to surround said end of said tubular extension.

11. The spool of claim 6, wherein said welding material is thermoplastic material having a plurality of ferromagnetic particles disposed therein enabling said thermoplastic weld material to melt when said ferromagnetic particles are subjected to alternating magnetic fields.

\* \* \* \* \*